(12) United States Patent
Nilica et al.

(10) Patent No.: US 7,989,381 B2
(45) Date of Patent: Aug. 2, 2011

(54) FUSION-CAST FIREPROOF PRODUCT

(75) Inventors: Roland Nilica, Feistritz (AT); Klaus Santowski, Frohnleiten (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 130 days.

(21) Appl. No.: 12/524,708

(22) PCT Filed: Feb. 26, 2008

(86) PCT No.: PCT/EP2008/001488
§ 371 (c)(1),
(2), (4) Date: Jul. 27, 2009

(87) PCT Pub. No.: WO2008/104354
PCT Pub. Date: Sep. 4, 2008

(65) Prior Publication Data
US 2010/0048377 A1    Feb. 25, 2010

(30) Foreign Application Priority Data
Feb. 28, 2007 (DE) .......................... 10 2007 010 173

(51) Int. Cl.
*C04B 35/484* (2006.01)
*C04B 35/05* (2006.01)
(52) U.S. Cl. ......... 501/104; 501/108; 501/120; 501/122
(58) Field of Classification Search ................. 501/104, 501/108, 120, 122
See application file for complete search history.

(56) References Cited

U.S. PATENT DOCUMENTS

| 4,106,947 | A |   | 8/1978  | Recasens et al. |         |
|-----------|---|---|---------|-----------------|---------|
| 4,294,795 | A | * | 10/1981 | Haga et al.     | 264/332 |
| 4,880,757 | A | * | 11/1989 | Henslee et al.  | 501/104 |
| 5,204,298 | A | * | 4/1993  | Yaoi et al.     | 501/108 |
| 5,679,612 | A |   | 10/1997 | Endo et al.     |         |
| 6,723,672 | B1| * | 4/2004  | Stuart et al.   | 501/104 |

FOREIGN PATENT DOCUMENTS

| DE | 1170305    B  |   | 5/1964  |
|----|---------------|---|---------|
| DE | 2635030    A1 |   | 2/1977  |
| EP | 0460959    A2 |   | 12/1991 |
| EP | 0633232    A1 |   | 1/1995  |
| FR | 952855     A  |   | 11/1949 |
| FR | 2723583    A1 |   | 2/1996  |
| JP | 03050151      | * | 3/1991  |
| JP | 2004099441 A1 |   | 4/2004  |
| WO | 2004048290 A1 |   | 6/2004  |

* cited by examiner

*Primary Examiner* — Karl Group
(74) *Attorney, Agent, or Firm* — Christopher L. Parmelee; Walker & Jocke

(57) ABSTRACT

A fusion-cast refractory product based on zirconium dioxide is provided. The zirconium dioxide crystals are stabilized by magnesium oxide and surrounded by at least one magnesium oxide-containing crystalline phase. The content of magnesium oxide-containing crystalline phases, relative to the total mass of the product, amounts to 1 to 8 wt. %. In an example, the stabilized zirconium dioxide crystals are surrounded by at least one of the following magnesium oxide-containing crystalline phases: forsterite, enstatite, cordierite or spinel.

6 Claims, No Drawings

FUSION-CAST FIREPROOF PRODUCT

The invention relates to a fusion-cast refractory product based on zirconium dioxide.

Due to its good corrosion resistance, zirconium dioxide [zirconia, $ZrO_2$] is highly suitable for the production of refractory products.

One important field of use for zirconium dioxide-based refractory products is, for example, the field of steel casting, where such products are used as continuous casting nozzles, slide gate plates and as wearing parts in particularly highly stressed areas.

Fusion-cast zirconium dioxide-based refractory products are used in glass tanks.

Zirconium dioxide exists in three modifications. At low temperatures zirconium dioxide is present in a monoclinic modification, which at approx. 1170° C. undergoes reversible transformation into a tetragonal modification. A further reversible transformation into a cubic modification of zirconium dioxide proceeds at approx. 2300° C.

Since the monoclinic low temperature modification is larger in volume than the two high temperature modifications, a zirconium dioxide-based product undergoes volume contraction or expansion upon respectively exceeding or falling below the transformation temperatures. During the production and use of zirconium dioxide-based refractory products, this leads to cracking in the product.

For this reason it is known to stabilise zirconium dioxide-based refractory products by the addition of oxides, in particular the oxides magnesium oxide (MgO), calcium oxide (CaO), yttrium oxide ($Y_2O_3$) or oxides of other rare earths, for example cerium oxide ($CeO_2$). These additions keep the high temperature modifications metastable down to room temperatures so reducing the anomalous thermal expansion and thereby enabling the production of zirconium dioxide materials.

Such stabilisation has the disadvantage, however, that it is lost when the product is used. The oxide used for stabilisation then migrates into the surrounding environment, for example a glass melt or slag, which results in a reduction in the volume of the product. This reduction in volume increases corrosive attack of the refractory product.

In the case of fusion-cast products with a high zirconium dioxide content, stabilisation is impossible, since these products contain a vitreous phase in addition to zirconium oxide, into which the oxide used for stabilisation migrates.

For this reason, stabilisation of the zirconium dioxide to reduce the risk of cracking is not currently carried out during the production of fusion-cast zirconium dioxide-based refractory products. Instead, the change in volume occurring in the zirconium dioxide product in the event of the temperature exceeding or falling below the transformation temperatures is currently buffered by way of the vitreous phase in the case of fusion-cast products. In this case, in fusion-cast products the zirconium dioxide is embedded in a vitreous phase rich in silicon dioxide, which vitreous phase acts as a buffer for the changes in modification undergone by the zirconium dioxide during heating and cooling.

Often, however, the vitreous phase is not able sufficiently to buffer the changes in volume during heating and cooling undergone by the zirconium dioxide-based product, such that, in particular during production of the product, cracks occur, which may lead to flaking of the product when in use.

Furthermore, the vitreous phase content of the product plays a significant role in the wear thereof.

Problems also arise in particular during cooling of the melt to produce fusion-cast products based on zirconium dioxide. The large temperature differences which occur during cooling of the melt and solidification thereof result in unfavourable crystallisation behaviour, in which mutually isolated areas comprising melt arise as a result of precipitation of solids. As solidification continues, this leads to shrinkage cavities distributed in disperse manner through the solidifying melt or the product. However, these shrinkage cavities significantly impair the quality of the product or even make the product unusable.

An object of the invention is to provide a zirconium dioxide-based fusion-cast refractory product with improved corrosion and wear characteristics. A further object of the invention is to suppress the occurrence of dispersely distributed cavities during cooling of the zirconium dioxide melt.

According to the application, this object is achieved by the provision of a fusion-cast refractory product based on zirconium dioxide, the zirconium dioxide crystals being stabilised by magnesium oxide and surrounded by at least one magnesium oxide-containing crystalline phase.

The fundamental consideration underlying the present invention is, in contrast with the prior art, to achieve stabilisation of zirconium dioxide by the addition of magnesium oxide (MgO) also in fusion-cast zirconium dioxide-based products. This stabilisation of the zirconium dioxide by the addition of magnesium oxide is achieved by the recognition according to the invention that migration of the magnesium oxide used for stabilisation into the aggressive surrounding may be slowed down or even prevented since the zirconium dioxide crystals stabilised by magnesium oxide are embedded in at least one magnesium oxide-containing crystalline phase or are surrounded by this crystalline phase.

Migration of the magnesium oxide stabilising the zirconium dioxide is presumably slowed down by the reduction of the concentration gradient between the stabilised zirconium oxide and the adjoining crystalline phase.

In the product according to the application, the magnesium oxide-containing crystalline phase thus surrounds the zirconium dioxide crystals stabilised by the MgO and thus assists stabilisation of the zirconium dioxide or maintains this stabilisation. The fusion-cast refractory product based on zirconium dioxide according to the application thus has significantly improved corrosion and wear characteristics relative to the zirconium dioxide-based fusion-cast products known from the prior art. The tendency of the product to crack during cooling of the melt may be significantly reduced.

At the same timer the product according to the application may be provided almost or even virtually completely without any dispersely distributed cavities. This is a consequence of extremely favourable crystallisation behaviour of the product according to the invention, which is presumably based on the smaller melting range of the system according to the application (MgO-stabilised $ZrO_2$-magnesium oxide-containing crystalline phase) in comparison with conventional systems ($ZrO_2$—$SiO_2$).

Preferably, the zirconium dioxide crystals stabilised by MgO are surrounded by at least one of the following magnesium oxide-containing crystalline phases: forsterite ($Mg_2SiO_4$), enstatite (magnesium metasilicate; $MgSiO_3$), cordierite ($2MgO.2Al_2O_3.5SiO_2$) or spinel ($MgO.Al_2O_3$).

The magnesium oxide-containing crystalline phase surrounding the stabilised zirconium dioxide crystals in the product according to the invention is not therefore a crystalline phase based on MgO and $ZrO_2$.

Forsterite displays particularly advantageous action in the product according to the application, such that in the fusion-cast refractory product according to the application the stabilised zirconium dioxide crystals are preferably surrounded by a crystalline phase of forsterite.

Preferably, the magnesium oxide-containing crystalline phases are formed in the product according to the application in situ during the production thereof, thus in particular during cooling after smelting. It is in this way possible purposefully to influence the formation of the magnesium oxide-containing crystalline phases by the nature and quantity of the raw material components.

In order to achieve such in situ formation of the magnesium oxide-containing crystalline phases during production of the product according to the application, raw material components are purposefully selected for production of the product according to the application which on the one hand bring about MgO stabilisation of the zirconium dioxide and on the other hand lead to formation of a magnesium oxide-containing crystalline phase around the zirconium dioxide crystals.

It may in this case be sufficient to produce the product according to the application solely from three raw material components:
1. a $ZrO_2$ raw material component.
2. an MgO raw material component.
3. at least one further raw material component (hereinafter also designated "further raw material component"), which forms a magnesium oxide-containing crystalline phase with some of the MgO raw material component.

The further raw material component is added in such a quantity that it forms in its entirety a magnesium oxide-containing crystalline phase with some of the MgO raw material component during production of the product according to the application. The remainder of the MgO raw material component stabilises the $ZrO_2$.

To form a magnesium oxide-containing crystalline phase in the form of forsterite or enstatite, a further raw material component in the form of $SiO_2$ may be selected, for example.

To form a magnesium oxide-containing crystalline phase in the form of cordierite, a first further raw material component in the form of $Al_2O_3$ and a second further raw material component in the form of $SiO_2$ may be selected, for example. For example, a further component containing both $Al_2O_3$ and $SiO_2$ may here also be selected, for example sillimanite or andalusite.

To form a magnesium oxide-containing crystalline phase in the form of spinel, a further raw material component in the form of $Al_2O_3$ may be selected, for example.

The contents of the various components in the product according to the application may be as follows, for example, the amounts indicated being in each case in weight % (mass %) and relating to the total mass of the product.

The content of magnesium oxide-containing crystalline phase may for example be $\geq 0.5\%$, i.e. for example also $\geq 1\%$, $\geq 1.5\%$ or $\geq 2\%$. The upper limit of the content of magnesium oxide-containing crystalline phase may for example be $\leq 10\%$, i.e. for example also $\leq 8\%$, $\leq 6\%$, $\leq 5\%$ or $\leq 4\%$.

The content of magnesium oxide-containing crystalline phase may accordingly be for example 0.5 to 10%, i.e. for example also 1 to 8%, 1 to 6%, 2 to 5% or 2 to 4%.

The fusion-cast product according to the application based on stabilised zirconium dioxide preferably comprises a product with a high zirconium oxide content (HZFC product).

The content of zirconium dioxide may for example be $\geq 70\%$, i.e. for example also $\geq 80\%$, $\geq 85\%$ or $\geq 90\%$. With regard to its maximum content, the content of zirconium dioxide may for example be $\leq 98\%$ i.e. for example also $\leq 97\%$, $\leq 96\%$ or $\leq 95\%$.

The content of zirconium dioxide may accordingly be for example 70 to 98%, i.e. for example also 80 to 98%, 85 to 97%, 90 to 96% or 90 to 95%.

The content of MgO in the product according to the application may for example be $\geq 0.5\%$, i.e. for example also $\geq 1\%$ or $\geq 2\%$. The MgO may for example be present in maximum contents of $\leq 10\%$, i.e. for example also in contents of $\leq 8\%$, of $\leq 6\%$ or of $\leq 4\%$.

MgO may be present in the product according to the application for example in contents of 0.5 to 10%, i.e. for example also in contents of 1 to 10%, of 2 to 8%, of 2 to 6% or of 2-4%.

The above MgO content is present in the product according to the application partially for stabilisation of the zirconium dioxide and partially in the magnesium oxide-containing crystalline phase.

The content of MgO serving to stabilise the zirconium dioxide may, according to the application, be greater than the MgO content in the magnesium oxide-containing crystalline phase. It may be provided according to the application that the ratio of the MgO content serving to stabilise the $ZrO_2$ to the MgO content in the magnesium oxide-containing crystalline phase is 6:5 to 15:1, i.e. for example also 3:2 to 7:1.

In addition to MgO, further oxides may be present for stabilising the zirconium dioxide in the product, for example one or more of the oxides CaO, $Y_2O_3$ or $CeO_2$, for example in contents of in each case 0.5 to 5%, i.e. for example also in contents of 0.5 to 3%.

In addition to the above-stated components, the product according to the application may comprise impurities, for example $Fe_2O_3$, $TiO_2$ or CaO. These impurities may have found their way into the product for example via contaminated raw materials, for example contaminated baddeleyite as raw material component for the zirconium dioxide. In particular, the product according to the application may also comprise impurities in the form of $HfO_2$ (hafnium dioxide), since natural zirconium minerals, in particular also baddeleyite, generally comprise 1 to 5% $HfO_2$. According to the application, the content of impurities is preferably $\leq 5\%$, i.e. for example also $\leq 3\%$, $\leq 2\%$ or $\leq 1\%$.

Two exemplary compositions of a fusion-cast refractory product according to the application are as follows:

EXAMPLE 1

| | |
|---|---|
| $ZrO_2$: | 92.4% |
| MgO: | 4.6% |
| $SiO_2$: | 1.4% |
| $HfO_2$: | 1.4% |
| Other impurities: | 0.2% |

This product has a forsterite content of 2%. The forsterite is composed of the entire $SiO_2$ content and 0.6% of MgO. The remaining 4.0% of MgO serves to stabilise the $ZrO_2$.

EXAMPLE 2

| | |
|---|---|
| $ZrO_2$: | 92.4% |
| MgO: | 3.2% |
| $SiO_2$: | 2.8% |
| $HfO_2$: | 1.4% |
| Other impurities: | 0.2% |

This product has a forsterite content of 4%. The forsterite is composed of the entire $SiO_2$ content and 1.2% of MgO. The remaining 2.0% of MgO serves to stabilise the $ZrO_2$.

A product according to the application may be prepared, for example, by the following method:

The raw materials zirconium dioxide, magnesium oxide and at least one further component, which together with some of the magnesium oxide forms a magnesium oxide-containing crystalline phase during the production process, are firstly mixed. The raw material quantities are here adjusted to one another in such a way that, during the production process, the further component is consumed in its entirety with some of the magnesium oxide component to form a magnesium oxide-containing crystalline phase.

The mixture of raw materials is then melted down in an electric-arc furnace under oxidising conditions.

Finally, the melt is poured into moulds or, to produce granulated material, left to solidify as a block.

After solidification, the product is removed from the moulds and, after appropriate machining (e.g. drilling, grinding, sawing), may be used for example to line glass furnaces, for example in the form of soldier course blocks.

The melt solidified into a block may be used for example to produce granulated material, which may serve for example as granulated raw material for the production of ceramic-bonded zirconium dioxide bricks, other bricks containing zirconium dioxide or unshaped products containing zirconium dioxide.

The invention claimed is:

1. A fusion-cast refractory product based on zirconium dioxide, the zirconium dioxide crystals being stabilised by magnesium oxide and surrounded by at least one magnesium oxide-containing crystalline phase, in which the content of magnesium oxide-containing crystalline phases, relative to the total mass of the product, amounts to 1 to 8 wt. %.

2. A fusion-cast refractory product according to claim 1, in which the stabilised zirconium dioxide crystals are surrounded by at least one of the following magnesium oxide-containing crystalline phases: forsterite, enstatite, cordierite or spinel.

3. A fusion-cast refractory product according to claim 1, in which the content of magnesium oxide-containing crystalline phases, relative to the total mass of the product, amounts to 1 to 6 wt. %.

4. A fusion-cast refractory product according to claim 1, in which the content of zirconium dioxide, relative to the total mass of the product, amounts to 80 to 98 wt. %.

5. A fusion-cast refractory product according to claim 1, in which the content of zirconium dioxide, relative to the total mass of the product, amounts to 90 to 96 wt. %.

6. A fusion-cast refractory product according to claim 1, in which the content of magnesium oxide, relative to the total mass of the product, amounts to 2 to 6 wt. %.

* * * * *